March 18, 1930.   G. JOHNSON   1,751,239
SEPARABLE FASTENER
Filed Aug. 11, 1927

Inventor:
Gustav Johnson
by Emery, Booth, Janney & Varney
Attys

Patented Mar. 18, 1930

1,751,239

UNITED STATES PATENT OFFICE

GUSTAV JOHNSON, OF WEST ROXBURY, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed August 11, 1927. Serial No. 212,279.

My invention aims to provide improvements in separable fasteners.

In the drawings, which illustrate preferred embodiments of my invention:—

Figure 7:
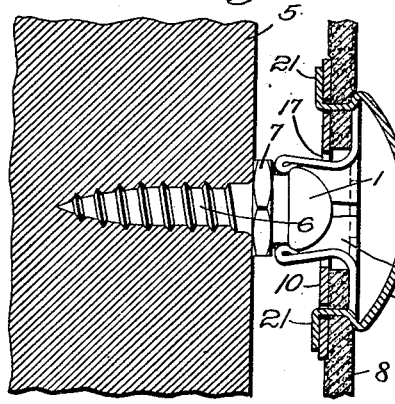
Fig. 7 is a section through a third form of the stud and socket installation, the stud being shown in elevation.

Referring to the drawings, which illustrate three embodiments of my invention, I have shown snap fastener installations particularly, though not exclusively, useful in securing together the edges of flexible materials or in securing a flexible material to a rigid support. The stud members may be of any suitable construction, according to the purposes for which they are to be used. For instance, in Figs. 2 and 5, I have illustrated stud members 1 secured to flexible carrying mediums 2 by means of attaching prongs 3 extending from the base 4 of the stud through the carrying medium 2 where they are clenched at the opposite side. It is to be understood, however, that any means of attaching the stud member to the flexible carrying medium may be used. In Fig. 7, I have shown the stud member 1 as being secured to a rigid support 5 by means of a screw 6 extending from the base 7 of the stud. It should also be understood that the stud member 1 may be secured to the rigid support in any other convenient manner.

Figure 1:
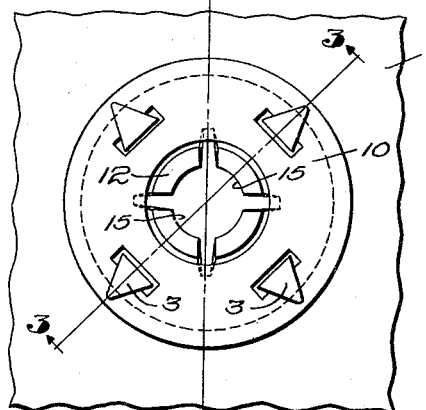
Figure 1 is an elevation of one form of socket installation as viewed from that side at which the stud enters.
Figure 2:
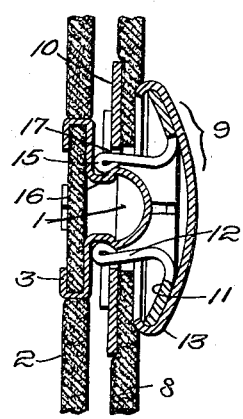
Fig. 2 is a section taken on the line 2—2 of Fig. 1, the stud installation also being shown in cross-section, the stud and socket being engaged.
Figure 3:
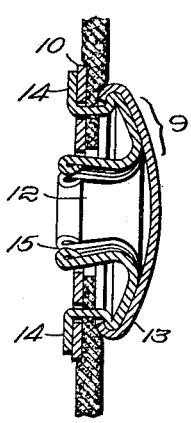
Fig. 3 is a section on the line 3—3 of Fig. 1.

Referring to the socket installation, illustrated in Figs. 1 through 3, I have shown a carrying medium 8 to which is secured a stud-receiving part 9 and an attaching plate 10. The stud-receiving part includes a plate portion 11 from which is pressed a plurality of resilient fingers 12 and to which is secured a cap portion 13. The plate portion 11 and cap portion 13 are located at the outer face of the carrying medium 8, while the attaching part 10 is located at the opposite face of the carrying medium 8 and attaching prongs 14 extend from the plate 11 through the carrying medium 8 and attaching plate 10 and are bent outwardly and downwardly against the plate 10, as shown in Figs. 1 and 3. The resilient fingers 12 extend through the carrying medium and the attaching plate 10, where they present reversely bent neck-engaging portions 15 for cooperative engagement with the neck 16 of the stud, as shown in Fig. 2. The aperture 17 in the attaching plate 10, through which the resilient fingers pass, is only large enough to permit normal expansion of the fingers during engagement and disengagement of the stud and socket. Therefore, when excessive lateral stresses are exerted upon the carrying mediums 2 and 8, the fingers 12 will be back-supported by the wall surrounding the aperture 17, thereby preventing undue expansion of the fingers 12.

Figure 4:
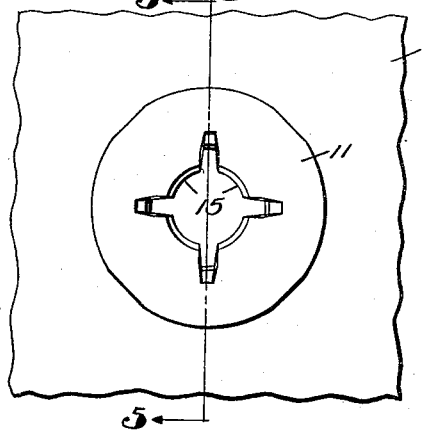
Fig. 4 is an elevation of a second form of socket installation as viewed from that side of the socket opposite the side which the stud enters.
Figure 5:
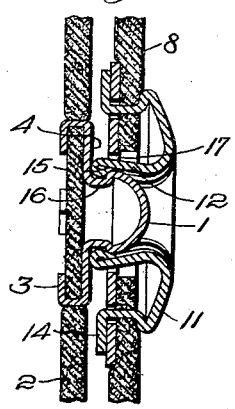
Fig. 5 is a section taken on the line 5—5 of Fig. 4, a stud installation also being shown and the stud and socket being engaged.
Figure 6:
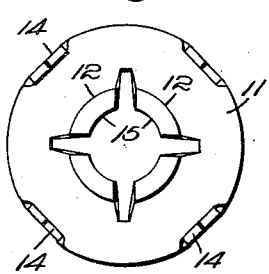
Fig. 6 is an elevation of the stud-engaging part of the socket member shown in Figs. 4 and 5.

The socket installation shown in Figs. 4 through 6 is the same as that shown in Figs. 1 through 3, except that in this instance the cap 13 secured to the plate 11, as shown in Figs. 2 and 3, is omitted without affecting the durability or attachment of the socket installation. These Figs. 4 through 6 are added to the drawings merely to show more in detail the construction of the one-piece stud-engaging part which includes the plate 11, fingers 12, neck-engaging portions 25 and attaching prongs 14 all pressed from a single piece of metal. The cap portion 13, shown in Figs. 2 and 3, is necessary only when it is desirable to conceal the opening and the slits provided in the plate 11.

Figure 8:
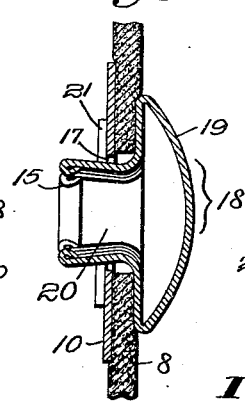
Fig. 8 is a section of the socket member shown in Fig. 7, this section being taken through the resilient stud-engaging portions of the socket.
Figure 9:
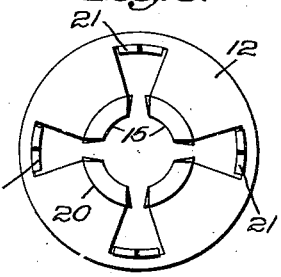
Fig. 9 is an elevation of the stud-engaging portion of the socket shown in Figs. 7 and 8.

In Figs. 7 through 9, I have shown a socket installation in which the socket-engaging part 18, including the cap portion 19, is pressed from a single piece of metal. In this instance, the stud-engaging fingers 20 extend inwardly from the periphery of the cap portion 19 and then outwardly, as shown in Figs. 8 and 9. Between the fingers 20 adjacent to the edge of the cap portion, at the under side thereof, is provided the prongs 21 for securing the socket-engaging part to the carrying medium 8 in substantially the same manner as shown in the other embodiments of my invention above described.

By locating the base portions of the stud-engaging parts, illustrated in the various embodiments of my invention, upon one side of the carrying medium and arranging the fingers 12 so that they extend through the carrying medium to present a stud-receiving aperture surrounded by the neck-engaging portions 15 between which the head of the stud may be entered, as shown in Figs. 2, 5 and 7, I am permitted to provide fingers of substantial length. By providing relatively long fingers, I avoid the possibility of setting the fingers over a long period of constant operation of the fastener. It is also important to have the fingers as long as possible, in order that they may be freely resilient for expansion and contraction during engagement and disengagement with a stud.

The base portion 11 of the stud-engaging part may be "dished", as shown in the first two embodiments of my invention, or it may be flat, as shown in the third embodiment. The first two types of sockets are, perhaps, better construction, because the fingers 12 may be made just as long as is shown in the third embodiment with the following added advantages. It permits the socket support to lie closer to the stud support and also provides for back-supporting the fingers 12 near their free ends as will be clearly understood by a comparison of Figs. 2 and 7.

While I have shown and described three embodiments of my invention, it will be understood that I do not wish to be limited thereby, my invention being best described in the following claims.

Claims:

1. In a fastener socket installation, a stud-receiving part, an attaching plate and a socket-carrying medium located between support-engaging faces of the stud-receiving part and attaching plate, said stud-receiving part presenting a plurality of resilient fingers of substantial length passing through the carrying medium and terminating at the opposite side to present a stud-receiving aperture at the free ends of said fingers surrounded by a plurality of neck-engaging jaw portions for engagement with a stud when presented from that side of the carrying medium at which the attaching part is located and attaching prongs formed integral with said stud-receiving part and passing through the socket-carrying medium thereby to engage the attaching plate and secure the parts of the socket installation together.

2. A separable fastener installation comprising, in combination, a stud member secured to a suitable carrying medium, a socket member secured to a carrying medium overlying the stud-carrying medium, said socket member including a one-piece stud-receiving part having a flange portion located at the outer face of the socket-carrying medium and presenting a plurality of relatively long stud-engaging fingers passing through the socket-carrying medium and engaging the stud member at the opposite side of the carrying medium in a plane remote from the plane of said flange portion, and attaching means formed integral with the stud-receiving part and passing through the carrying medium to assist in securing the stud-receiving part to the carrying medium.

3. A separable fastener installation comprising, in combination, a stud member secured to a suitable carrying medium, a socket member secured to a carrying medium overlying the stud-carrying medium, said socket member including a one-piece stud-receiving part having a flange portion located at the outer face of the socket-carrying medium and presenting a plurality of relatively long stud-engaging fingers passing through the socket-carrying medium and terminating at the opposite side from the said flange for engagement with the stud member, attaching prongs formed integral with the stud-receiving part passing through the carrying medium at a distance laterally from the stud-engaging fingers to secure the stud-receiving part to the carrying medium, and a cap portion forming an integral part of the stud-receiving part, said cap portion concealing the stud-receiving aperture, stud-engaging fingers, and head of the stud.

In testimony whereof, I have signed my name to this specification.

GUSTAV JOHNSON.